United States Patent [19]

Lumelsky et al.

[11] Patent Number: 4,949,169
[45] Date of Patent: Aug. 14, 1990

[54] AUDIO-VIDEO DATA INTERFACE FOR A HIGH SPEED COMMUNICATION LINK IN A VIDEO-GRAPHICS DISPLAY WINDOW ENVIRONMENT

[75] Inventors: Leon Lumelsky, Stamford, Conn.; Sung M. Choi, White Plains; Alan W. Peevers, Peekskill, both of N.Y.

[73] Assignee: International Business Machines Corporation, Armonk, N.Y.

[21] Appl. No.: 428,251

[22] Filed: Oct. 27, 1989

[51] Int. Cl.⁵ .............................................. H04N 7/10
[52] U.S. Cl. .................................... 358/86; 358/133; 358/903; 340/717
[58] Field of Search ............... 358/143, 133, 141, 148, 358/149, 86, 108, 93, 903, 181, 185, 22; 379/53; 340/717

[56] References Cited

U.S. PATENT DOCUMENTS

| | | | |
|---|---|---|---|
| 4,649,428 | 3/1987 | Jones et al. | 358/903 X |
| 4,654,484 | 3/1987 | Reiffel et al. | 358/133 X |
| 4,686,698 | 8/1987 | Tompkins et al. | 379/53 |

Primary Examiner—James J. Groody
Assistant Examiner—Victor R. Kostak
Attorney, Agent, or Firm—Roy R. Schlemmer, Jr.

[57] ABSTRACT

An interface architecture for interconnecting a plurality of video display devices together over a high speed digital communication link having limited bandwidth provides at each node for transmitting during a "transmit mode"; (1) sequential pixels of digital data (COMVIDOUT) comprising separate luminance and chrominance fields, from a digital TV source associated with each display node which data represents a scaled video window, (2) the local system clock (SCLK), (3) vertical and horizontal communication sync signals (COMVSOUT and COMSHOUT), (4) luminance and chrominance clock enable signals (COMYOCE and COMCOCE) based on a scaling algorithm utilized in the transmitting video device to insure that both the proper pixels and the proper luminance and chrominance fields associated with these pixels are selected by the communications device for transmission. Further, the interface architecture at each display node provides for receiving during a "receive mode", (5) video input data pixels (COMVIDIN), (6) a video input data clock enable signal from the communications adapter (COMVINCE) which controls the storage of the received video data window in the local frame buffer, (7) horizontal and vertical video input sync signals from the communications adapter (COMHSIN and COMVSIN) for properly synchronizing the storing of the received video input data from the communications adapter into the frame buffer beginning ata predetermined address therein. The system utilizes, to a great extent, exisiting hardware in conventional video display device architectures and associated communications adapters such that a versatile generally applicable transmission system is achievable requiring a minimum of additional control hardware and software.

9 Claims, 14 Drawing Sheets

CCIR-601 (4:2:2)

PHILIPS (4:1:1)

FIG. 4A

| Y | ... | P | O | N | M | L | K | J | I | H | G | F | E | D | C | B | A |
|---|---|---|---|---|---|---|---|---|---|---|---|---|---|---|---|---|---|
| (B-Y) | | P | O | N | M | L | K | J | I | H | G | F | E | D | C | B | A |
| (R-Y) | | P | O | N | M | L | K | J | I | H | G | F | E | D | C | B | A |

FIG. 4B

| Y | O | M | K | I | G | E | C | A |
|---|---|---|---|---|---|---|---|---|
| (B-Y) | L | K | J | I | D | C | B | A |
| (R-Y) | L | K | J | I | D | C | B | A |

AUDIO-VIDEO DATA INTERFACE FOR A HIGH SPEED COMMUNICATION LINK IN A VIDEO-GRAPHICS DISPLAY WINDOW ENVIRONMENT

Cross-Reference to Related Copending Applications

The two copending application Ser. No.: 314,623 of Lumelsky et al., entitled "Audio Video Interactive Display" and Ser. No.: 314,998 of Lumelsky et al., entitled "Color Television Window for a Video-Display Unit" contain detailed information about the display hardware used for the herein described communication systems interface environment.

A video sampling system using two separate frame buffers, one for graphics, and one for video, is described fully in the application Ser. No.: 314,623, "Audio Video Interactive Display". Furthermore, it also contains informations on how audio can be integrated with video by using the space of the video frame buffer which is not used by the video sampling.

Application Ser. No.: 314,998, "Color Television Window for a Video-Display Unit", describes in detail, how a full motion video can be shown on a window environment by translating and scaling the source images at the input of the frame buffer.

Field of the Invention

The present invention relates to the field of video display systems and especially to such systems incorporating audio video interactive display devices. It relates more particularly to such systems in which such audio video systems must communicate with each other over an arbitrary high speed digital communication network.

Background of the Invention

Transmitting and receiving full motion video over a network presents two problems. The first problem is the large bandwidth that is required to transmit full motion video images. If one is using digital television standard CCIR 601 (See Handbook of Recommended Standards and Procedures, International Teleproduction Society, 1987, p. 62), using Philips' "4:1:1" time multiplexing technique on the chrominance data (See FIG. 2), 12 bits of information represent a pixel. Notice that this is based on a luminance/chrominance (Y/C) representation which already reduces the bandwidth necessary per pixel compared to no time multiplexing or RGB representation. In conjunction with this standard, if the NTSC standard is selected, there are 720 active samples on a given scan line, and 525 scan lines per frame. At 60 Hz refresh rate, this translates to, Bandwidth=(720×525) pixels×12 bits/pixels×30 Hz=136.08 Mbits/sec The 30 Hz rather than 60 Hz is due to the interlacing inherent on the NTSC standard. This is a high bandwidth even for a high speed communication network such as FDDI which provides a 100 Mbits/sec data rate. However, this problem is doubled when one considers a full duplex communication. The required bandwidth for a full duplex communication would be 272.16 Mbits/sec. Something must be done to alleviate the bandwidth problem before full duplex video communication is possible.

The second problem is the interface between the communication device and the video adapter. Normal video sources have synchronization signals, one for the horizontal synchronization (—HS), or scan line synchronization, and one for the vertical synchronization (—VS), or field synchronization. The video adapter makes use of these signals to determine when to begin the next scan line and when to begin a new field. If full motion video is transmitted across a digital network, somehow there synchronization signals must be transmitted as well, and then they must be decoded at the receiver.

Furthermore, the audio needs to be sampled and played back at the same frequency. The time intervals between the audio data must be equally spread out in the time domain, otherwise there will be distortion when recreating the analog audio signal.

There is accordingly a need in the art for an interface to a high speed communication adapter which is simple and cheap to implement but effective for both audio and video transmission, and which will also provide means for reducing the bandwidth requirement. The interface must be capable of interfacing digitized full motion video and audio to an arbitrary high speed digital communication network.

It should be clearly understood that the present invention is independent of the digital sampling technique used. For example, if a (standard red, green, blue) RGB representation were used, all that is described herein relative to the disclosed embodiment would remain valid save that it would require 24 bits per pixel (8 for red, 8 for green and 8 for blue), thus increasing the bandwidth requirement on the communication network even further.

Description of the Prior Art

The following patents were found as the result of a prior art search. The relevancy of each to the present invention is individually set forth below. It is to be noted generally, however, that none of the patents disclose or suggest the video display device communication interface of the present invention.

Pat. Nos.: 4,686,698 and 4,710,917 both discloses an analog distribution network which incorporates frequency multiplexing on a coax cable to achieve fully duplexed video/audio transmission. The lower frequency band of the same cable can be used by the computer data. This is principally different from the present design in that it uses a special set of communication hardware (coax cable, RF modulator, low band pass filter for computer data, etc. . . .) to transmit the analog video/audio signals. Notice that with the present design, both video and audio are transmitted as a digitized data packet (just like any other computer generated data packets) and thus can be used in already defined high speed digital communication networks such as FDDI.

Pat. Nos.: 4,748,618 discloses a Telecommunication Network Interface. The patent describes a telecommunication interface which is capable of asynchronously receiving and transmitting digital information through the use of a dual port memory. The present invention specifically defines a detailed interface to the communication network, including how the interface signals can be generated, and how they should be used. The patent (618) mentions only that the video be stored into a dual port memory and read out asynchronously. The present invention also differs from (618) in that it teaches a way to reduce the bandwidth required to transmit the video information by a method of scaling the video window size arbitrarily.

Pat. No.: 4,574,374 generally relates to a stand-alone video-conferencing system, requiring specialized rooms with expensive "MLCT" units to perform the communication. There is only one video source active on the network at a time, with a voice-based switching scheme determining which video source is transmitted. Audio information for all locations is sent all the time, not just audio for the current video data stream as in the present invention. There is no concept of scaling down the video before transmission, to allow a dynamic allocation of the communications bandwidth.

Pat. No.: 4,645,872 discusses a Centralized Video/Audio Switch Matrix device. It does not address scaling of the video image window nor the interface from the video/audio adapter to the communication adapter as does the present invention. Basically this patent describes a set of switching matrix devices where various video and audio input signals can be interconnected to the video and audio output (analog switches with analog signals).

Pat. No.: 4,650,929 refers to an analog distribution network, and accordingly doesn't relate directly to the disclosed invention. There are no local frame buffers and no scaling in the disclosed system, so there can be no way of dynamically allocating bandwidth (the bandwidth is constant, with each user getting a separate, dedicated, analog channel). The audio in this system is transmitted on a separate, "medium band" channel, hence is not integrated with the digital information.

Summary and Objects

It is a primary object of the present invention to provide a simplified general purpose interface architecture for connecting a video display device with a high speed communication system linking said device with other similar devices at other nodes in the communication system.

It is a further object of the invention to provide such an interface architecture which is both general in nature and is cost effective in that it minimizes bandwidth requirements within the channel.

It is another object of the invention to provide such an interface architecture which effectively uses existing hardware in the video device requiring minimum additional hardware support.

It is yet another object of the invention to provide such a system which is also capable of transmitting accompanying audio data together with the video data.

Other objects, features and advantages of the invention will be apparent from the subsequent description of the invention as set forth in the specification, drawings and claims.

The objects of the present invention are accomplished in general by an interface architecture for interconnecting a plurality of video display devices together over a high speed digital communication link having limited bandwidth. The interface architecture at each display node provides for the transmitting during a "transmit mode" of, (1) sequential pixels of digital data (COMVIDOUT) comprising separate luminance and chrominance fields, from a digital TV source associated with each display node representative of a scaled video window, (2) the local system clock (SCLK), (3) vertical and horizontal communication sync signals (COMVSOUT and COMSHOUT), (4) luminance and chrominance clock enable signals (COMYOCE and COMCOCE) based on a scaling algorithm utilized in a transmitting video device to insure that proper luminance and chrominance fields are selected by the communications device for transmission. Further, the interface architecture at each display node provides means for receiving during a "receive mode", (5) video input data pixels (COMVIDIN), (6) a video input data clock enable signal from the communications adapter (COMVINCE) which enables the received video data to be stored in the local FIFO, and (7) means for receiving and utilizing horizontal and vertical video input sync signals from the communications adapter (COMHSIN and COMVSIN) for properly synchronizing the storing of the received video input data from the communications adapter into the frame buffer.

According to a further aspect of the invention means are included for accessing and transmitting audio data related to the video display data on portions of the network bandwidth not utilized by the video transmission.

The objects of the present invention are accomplished moreover by cleverly utilizing the existing hardware in the various video display devices and associated communications adapters such that the resultant cost efficient and generalized narrow bandwidth transmission system is achievable requiring a minimum of additional control hardware and software.

Brief Description of the Drawings

FIG. 3A comprises a high-level functional block diagram of the interface between a video device and the communications network.

FIGS. 4A and 4B are diagrammatic illustrations of luminance and chrominance bits which would be stored in the buffer both before and after scaling down.

FIGS. 5A and 5B are high level functional block diagrams of the audio interface wherein FIG. 5A illustrates the overall organization of the audio portion of an audio/video device and FIG. 5B specifies the actual audio interface design.

Description of the Preferred Embodiment

Figure 1A:
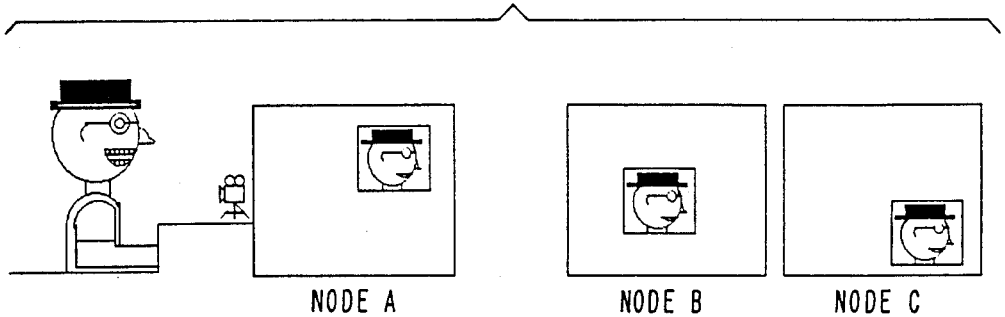
FIGS. 1A and 1B are pictorial representations of video display operations including "windowing" features occurring in a video graphics communication network system.

The mapping of a television image on a graphics screen generally requires the image to be sampled and stored into a frame buffer. This allows the provision of a time base correction and, if necessary, a time compression of the television image in order to show both television and graphics images on the same screen. The primary objective of the present invention is to provide a simple interface to a high speed digital communication network such that full motion video window images and its audio sampled by one node can be transmitted over the network to other nodes. The receiving node(s) would be able to display the same full motion video window that the transmitting node sends anywhere on its high resolution raster graphics display. Furthermore, audio is transmitted over the network, and can be heard together with the video. Going one step further, a mechanism is provided which can achieve a full duplex communication such that two way transmission of both video and audio can be realized. FIG. 1 illustrates two possible combinations using the communication network. First, FIG. 1A illustrates the broadcast mode where there are a transmitter and multiple receivers. The transmitting node would be able to display the video that it transmits on its high resolution graphics display as shown by node A. All the receiving nodes, shown as nodes B and C, would display the same video at their own displays. Although the size of the video window remains constant on all nodes, the location of the video window can be different for each of the receiving nodes. Meanwhile audio is also broadcast from the node A to the rest of the nodes.

Figure 1B:
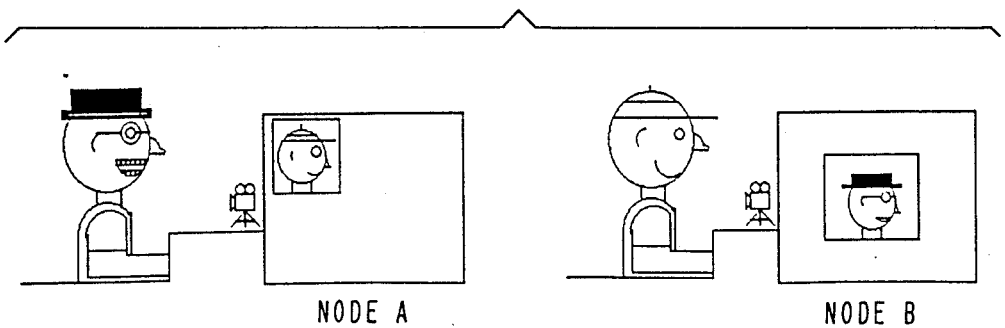

The second possibility, a full duplex communication mode, is shown on FIG. 1B. Node A transmits its audio and its video to the node B. Node B transmits its audio and its video to the node A. The size of the window can be different as determined by the transmitter, but the location of the video window can be determined at the local receiver.

The present invention provides a way to reduce the bandwidth requirement for video transmission and to provide a simple interface to the communication device.

Bandwidth Solution

Before bandwidth reduction is discussed, the scaling mechanism should be understood. As described in the previously referenced application Ser. No.: 314,998, scaling down of the source image is done by skipping pixels in the horizontal direction, and by skipping scan lines in the vertical direction at the input to the FIFO (32 in FIG. 3B) utilized for storing scaled video pixels prior to storing in the frame buffer 34. For a specific discussion of the scaling operation including the function of the FIFO reference should be made to said co-pending application. The scaling operation forms no part of the present invention and accordingly is not described in detail herein. Any mechanism for producing a scaled down video image could be used as well.

As mentioned before, scaling is done before the FIFO by ignoring predetermined pixels. Although simple in concept, this has a drastic effect on the bandwidth required to transmit the video information. Notice that rather than transmitting a whole screen, if a smaller, scaled down image of 320×240 pixels (a quarter of IBM's VGA display in graphics mode) is transmitted, then the bandwidth required to transmit the video window is, Bandwidth=(320×240) pixels×12 bits/pixels×30 Hz=27.65 Mbits/sec.

It should be mentioned that the bandwidth required is actually a function of the scale down ratio. The smaller the scaling, (the greater the size reduction) the smaller the bandwidth required. Since the video source can be scaled down to any arbitrary sized window, it gives the users control over the bandwidth requirement to match the high speed communication network capability that is being used by limiting the image window size allowed.

In order to further reduce the bandwidth, the following can be done as well. It is possible to take advantage of the inherent interlaced property of television. Thus only every other image field is transmitted. Either even or odd fields are transmitted but not both. This will also reduce the bandwidth of the network by a factor of two at the expense of the vertical image resolution. This is the approach utilized herein. Copending application Ser. No.: 314,998 shows how this is done.

Even in a full duplex video window communication, if the above approaches are used, then the total bandwidth required for a full duplex transmission of the video window of 320×240 pixels would be 27.65 Mbits/sec. This is a reasonable bandwidth when one considers a high speed communication network.

Before proceeding with a detailed description of the present embodiment in conjunction with the drawings, there will first be presented a list of all the acronyms used in the Figures. Most of these acronyms relate to the various interface and other control signals generated in the hardware during the operation of the present system.

| | |
|---|---|
| SCLK | System Clock. |
| COMVIDOUT | Communication Video Data Output. |
| COMVIDIN | Communication Video Data Input. |
| YFIFOSI | Luminance FIFO Shift In. |
| CFIFOSI | Chrominance FIFO Shift In. |
| COMVINCE | Communication Video Input Clock Enable. |
| COMYOCE | Communication Luminance Output Clock Enable. |
| COMCOCE | Communication Chrominance Output Clock Enable. |
| VS | Vertical Synchronization pulse. |
| HS | Horizontal Synchronization pulse. |
| COMVSOUT | Communication Vertical Sync Output. |
| COMHSOUT | Communication Horizontal Sync Output. |
| COMVSIN | Communication Vertical Sync Input. |

| | -continued |
|---|---|
| COMHSIN | Communication Horizontal Sync Input. |
| LOCALVS | Local Vertical Sync. (goes to local frame buffer controls.) |
| LOCALHS | Local Horizontal Sync. (goes to local frame buffer) |
| COMRCV | Communication Receive. (this is a bit settable from the host computer which tells the interface controls that the system should be in the Receive mode.) |
| TAKE C | Take chrominance data. (goes to communication adapter as COMCOCE or to local controls as CFIFOSI to control the proper combination of luminance and chrominance bits as required by the scaling logic.) |
| TAKE Y | Take luminance data. (goes to communication adapter as COMYOCE signal or to local controls as YFIFOSI to control the proper combination of luminance and chrominance bits as required by the scaling logic.) |
| RSTENHS | Reset ENHS. |
| ENHS | Enable COMHSOUT. |
| RSTENVS | Reset ENVS. |
| ENVS | Enable COMVSOUT. |
| RDFF | Reset Direct Flip-Flop. |
| RFF | synchronous Reset Flip-Flop. |
| TFF | Toggle Flip-Flop. |
| FF | (regular) Flip-Flop. |

The following acronyms refer to the audio portion of the interface.

| COMAUD | Communication Audio. |
|---|---|
| COMADIRQ | Communication Audio Data Input Request. |
| COMADORQ | Communication Audio Data Output Request. |
| HSLE | Horizontal Sync Leading Edge. |
| COMAUDIO | Communication Audio Bit. (this is a bit which must be set when in the communication audio mode.) |
| ADDATRDY | Audio A/D Data Ready. |
| COMIN/-OUT | Communications Input (or) Output. |

FIG. 3A broadly illustrates or defines the interface between the video device 10 and the I/0 device 12 which in the present usage would be some sort of a communication adapter. As is well understood in the art, the interface is specified or defined by the signals appearing on the 32 lines passing between the video device and the I/0 device. This interface is general in nature in that it can easily adapt to a wide variety of communication networks since the bandwidth may be selected depending on the amount of scaling involved as will be described more fully subsequently.

It will, of course, be understood by those skilled in the art that not all of the control signals appearing on the interface between the video device and the I/0 device are necessarily sent out over the communication network. It is provided to the I/0 device for proper synchronization of the video data with appropriate horizontal and vertical sync signals, etc. . . . Further, as will be described subsequently, scaling is actually implemented within the communication adapter under control of various signals appearing on the interface.

Referring to the figure it will be noted that the output or transmitting portion of the interface appears on the seventeen lines at the top including the actual video data COMVIDOUT with the five control lines shown immediately below. Similarly the lower fifteen lines relate to data input or receive operations and comprise the video data COMVIDIN and the three control lines immediately therebelow.

Figure 3B:
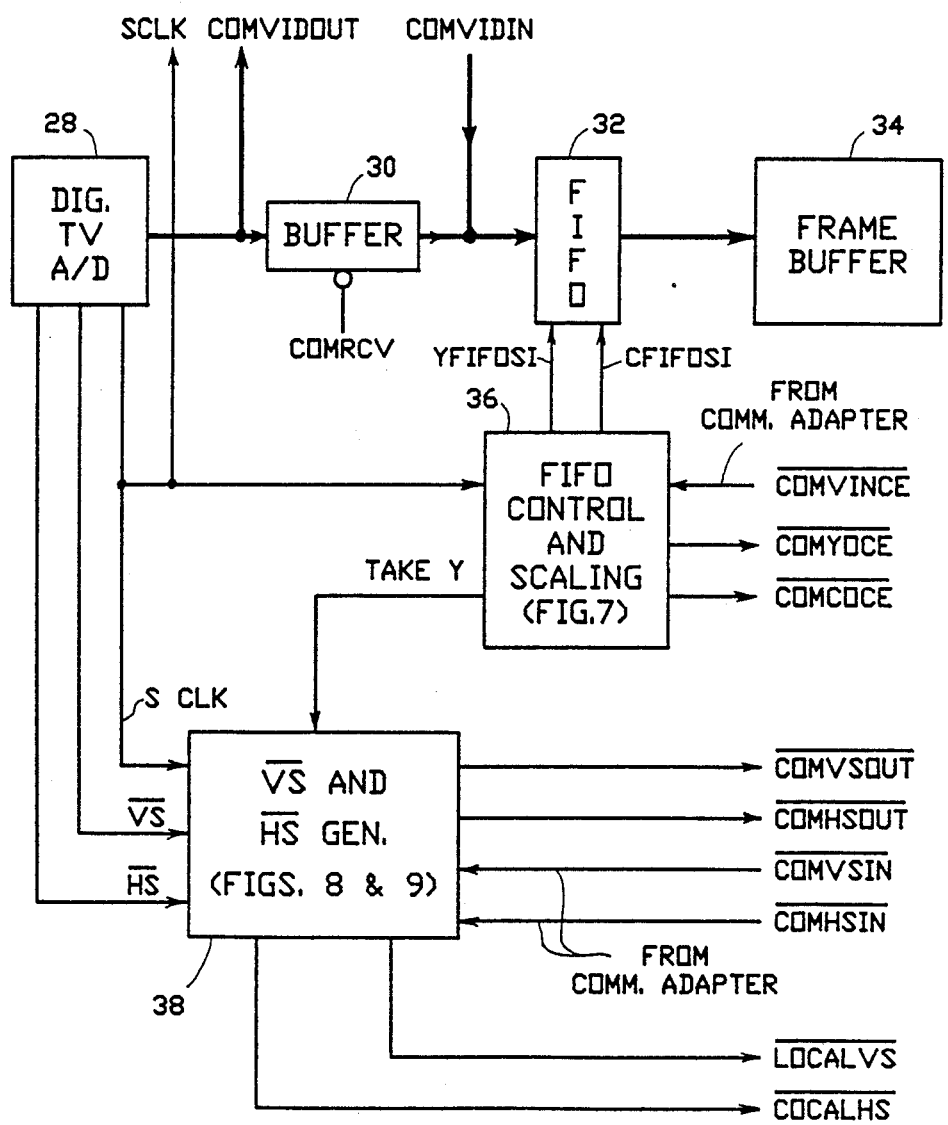
FIG. 3B comprises a diagrammatic representation of the video device of FIG. 3A showing the primary functional units which generate and/or utilize the various interface signals.

FIG. 3B is a functional block diagram of the video device shown in FIG. 3A. It will be noted that all of the interface lines shown on FIG. 3A are specifically shown and the source clearly indicated in FIG. 3B. All of the functional blocks shown in FIG. 3B are basically present in a video buffer having scaling capabilities such as set forth in previously referenced application Ser. No. 314,998. Thus the digital TV A/D block 28 provides standard digitized TV signals wherein the pixel data is provided to a conventional buffer 30 and directly to the video data output bus labeled COMVIDOUT which proceeds to the I/0 adapter. The buffer 30 is conventional and provides a way to isolate TV A/D input from COMVIDIN. The video data is temporarily stored in the FIFO 32 until they can be stored into the frame buffer 34. The buffer 30 may be disabled by the COMRCV bit, as explained subsequently, when it receives a window image over the communication network.

FIFO Control And Scaling block 36 provides means by which the scaling is done in the system and provides for the skipping of certain scan lines and pixel data as set forth in the above copending application Ser. No. 314,998. The frame buffer 34 is loaded from the FIFO in a conventional manner. The FIFO control and scaling logic block 36 operates under control of the scaling mechanism and determines and specifies which chrominance and luminance data are to be stored into the FIFO 32 and sent to the frame buffer to achieve the desired data reduction (scaling). This block is also utilized to produce COMYOCE and COMCOCE signals and deliver same to the present interface whereby the channel adapter using a FIFO similar to 32 within the video device performs the same scaling operation for subsequent transmission over the communication path.

The FIFO controls and scaling block 36 also produces YFIFOSI and CFIFOSI impulses which control the loading of the video adapter FIFO 32 to appropriately scale the window data into the frame buffer 34. The circuits producing the above referenced pulses are shown and described in greater detail with reference to FIG. 7 subsequently.

Block 38 entitled VS and HS generator produces the various vertical and horizontal synchronization pulses shown in the figure as COMVSOUT, COMHSOUT, LOCAL VS, LOCAL HS.

The details of the circuitry for producing these pulses is shown and described in further detail subsequently with respect to FIGS. 8 and 9.

The present communication interface has been designed to be simple, and yet, be general enough so that different communication devices can be easily attached. Thus, the communication interface was designed to closely approximate that of the video interface.

Stated generally, the video communications interface of the present invention comprises two sections, a video transmitter interface and a video receiver interface. When receiving video data via the communication network as desired, then the communication receive bit (COMRCV) is set which will disable the buffer 30. The input video data and the input controls to the FIFO then come from the communication adapter instead of from the TV video source in the video device itself.

Whether a particular transmission is to be duplex (two way) or one way (broadcast) is determined in advance by the host CPU. If it is duplex, the COMRCV bit is set so that a given transmitting video device will see the other device window image when in the duplex mode, but will see his own image if in the broadcast mode. Obviously other devices on the system, when in the receive mode, will see the window image from the transmitting device.

Transmitting the video is also a simple matter. The communications adapter receives the pixel data directly from the digital television A/D converter 28 (FIG. 3B) and receives the scaling control signals from the scaling logic as shown in block 36 of FIG. 3B and utilizing the pixel data and the scaling control signals produces the scaled video pixel data stream which is then transmitted over the communication channel.

The communication adapter 12 is intended to be general in nature as is the actual communication channel whether it be copper, optical fiber, etc.. Provided with the present interface architecture, it is believed that any digital engineer skilled in this art could easily design a matching communication adapter interface.

Figure 13:
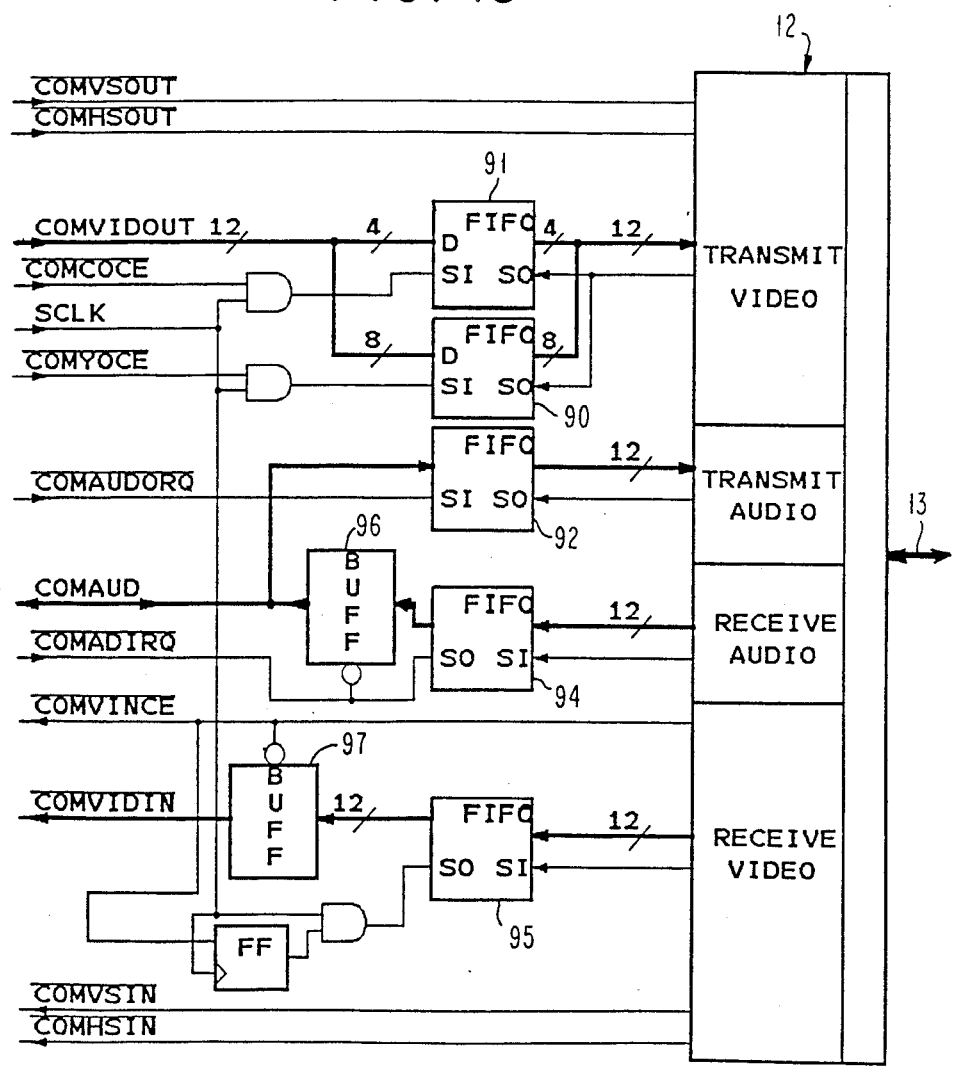
FIG. 13 comprises a functional block diagram of the front end of the Communication Adapter shown in FIG. 3A.

However, for convenience of reference the high level functional block diagram of the front end of such an adapter is illustrated by way of example in FIG. 13. All of the interface data and command lines for both video and audio are clearly marked. As indicated previously the communication adapter is provided with a set of FIFO's similar to the FIFO 32 shown in FIG. 3B and they operate in the same fashion.

Thus FIFO's 90 and 91 store luminance and chrominance data respectively received from the video device under control of the COMYOCE, COMCOCE signals.

FIFO's 92 and 94 store audio data to be transmitted over and received respectively from the channel.

Similarly FIFO 95 stores incoming video data from the channel. Generally, the FIFO's provide an easy mechanism for temporarily storing data for later use and also provide a convenient interface means for adapting the channel data rate with the video device data rates. The two buffers 96 and 97 provide further temporary storage to allow time for certain data manipulations such as D/A conversion.

The channel adapter and channel 12 are intended to be quite conventional in nature and can take many different physical forms and utilize any desired communication protocol.

One possible communication data format is described below. Two data packets are defined as follows:

VIDEO/AUDIO PACKET—The Video and Audio Data Packet. Contains a scanline of video and audio information VS PACKET—Vertical Sync Packet. A special short PACKET used to sync the receiver for a new frame.

VIDEO/AUDIO PACKET

| SD | HEADER | AUDIO DATA | VIDEO DATA | ED |

VS PACKET

| SD | HEADER | ED |

SD: Start Delimiter. Communication network physical layer defined.

HEADER: Header information. Typically, this is both communication network and user defined. It would have information such as the source address, destination address, word count, message priority level, etc. . . . , which are communication network defined, and AUDIO DATA word count, scaline count, VS PACKET identifier, etc. . . . , which are user defined.

AUDIO DATA: Audio Data transmitted.

VIDEO DATA: Video Data Transmitted.

ED: End Delimiter. Communication network physical layer defined.

Transmit Mode: Referring to FIG. 13 the transmitting node stores up video and audio data for a scan line in the FIFO's 90–91. Upon receiving —COMHSOUT from the Video Device, the transmitter forms the VIDEO/AUDIO PACKET and transmits it via the communication network. Typically, AUDIO DATA is either 0 or a single 12-bits of information stored in the communication audio output FIFO 94. The number of VIDEO DATA sets is the number of pixels per scanline after scaling.

When the transmitting node sees —COMVSOUT from the Video Device, the transmitter forms the VS PACKET and transmits it via the communication network.

Receive Mode: The receiving nodes each receive the VIDEO/AUDIO PACKET and store video data and audio data into the video data FIFO 95 and audio data FIFO 94, respectively. The communication adapter will also generate COMVINCE— which is synchronous to SCLK to signal the Video Device to take the video data from the video receive FIFO 95. Upon receiving a complete VIDEO/AUDIO PACKET, the communication adapter generates —COMHSIN to signal the Video Device that a scanline of video information has been received and is available for storage/display.

When the node receives a VS PACKET from the communication network, then the communications adapter generates —COMVSIN to signal the Video Device that the current video frame has been received completely.

The following is a diagrammatic illustration of a Frame Transmission (N scanlines per frame):

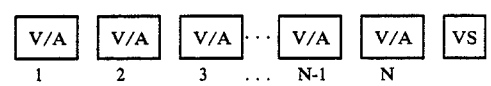

V/A-VIDEO/AUDIO PACKET (for one scanline)
VS-VS PACKET

It should be noted that the present invention is independent of how the video and audio data, along with synchronization timing, is actually transferred on the communication network. Shown above is one possible way of video/audio communication. Many different communication protocols (depending on the network communication utilized) can be implemented with a small amount of interface logics.

Video Transmitter Interface

On the transmit interface, there are 4 control signals. The first is the Communication Vertical Synchronization Output (—COMVSOUT) which is derived from the television Vertical Synchronization (—VS). This signal specifies that a new video frame is about to be transmitted. The second is the Communication Horizontal Synchronization Output (—COMHSOUT)

which is derived from the television Horizontal Synchronization (—HS). This signal specifies that the current scan line transmission has ended. The third is the Communication Chrominance Output Clock Enable (—COMCOCE) which specifies that there are chrominance bits ready to be transmitted. And finally the fourth is the Communication Luminance Output Clock Enable (—COMYOCE) which specifies that there are luminance bits ready to be transmitted. All four signals are generated by the video device and are synchronized to SCLK.

Figure 2A:
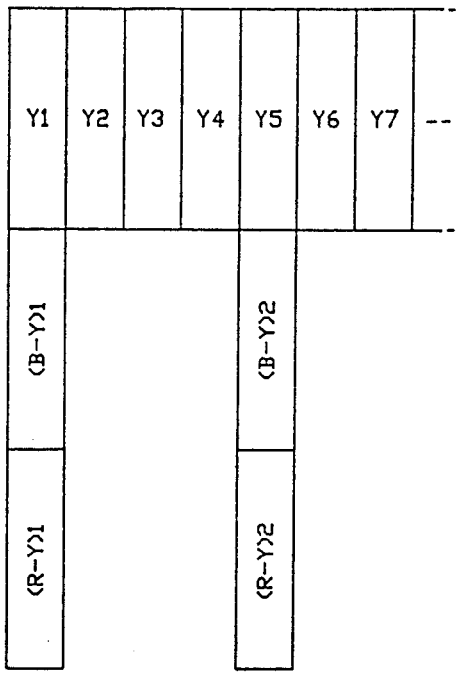
FIG. 2A is a diagrammatic representation of the digital-television technique for representing a color television signal illustrating the representation of the actual luminance and chrominance data.
Figure 2B:
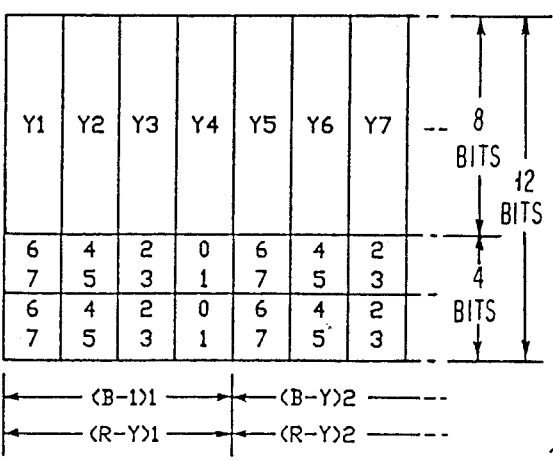
FIG. 2B comprises a diagrammatic representation similar to FIG. 2A illustrating how consecutive pixels of luminance and chrominance data of a digital TV signal are conventionally stored in a video frame buffer utilizing a time multiplex technique.

The 12 bit Communication Video Data Output (COMVIDOUT) can be subdivided into 4 bits of chrominance and 8 bits of luminance (See FIG. 2B). The reason for having separate clock enables for chrominance and luminance is the following.

As described in application Ser. No.: 314,998, the standard the television coding schemes, either NTSC, PAL or SECAM are all based on luminance/chrominance (Y/C) representations, rather than RGB, which reduces the bandwidth of the composite video signal and memory required to store the image frame. Furthermore, some digital television chips already in production use a time multiplexing technique to reduce the bandwidth required for chrominance information. When the source video is being scaled down in the horizontal direction, it is not possible to simply skip chrominance pixels due to the time multiplexing. Notice that for chrominance, the smallest horizontal resolution is 4 pixels wide rather than the 1 pixel resolution for luminance. Therefore, it is necessary to keep the synchronization of the chrominance bits by periods of four system clock cycles, and failing to do so will result in corrupt color on the destination screen for all pixels that are out of synchronization.

FIG. 4B shows 2:1 image compression on a scan line with the time multiplexing technique. Notice that luminance bits are simply skipped at every other pixel, but chrominance bits are skipped by groups of four pixels only. Since the luminance bits and the chrominance bits are are skipped differently due to the time multiplexing technique, two enables, —COMCOCE and —COMYOCE, are necessary to enable them separately. If the sampling of the video were being done without the time multiplexing techniques, then —COMCOCE and —COMYOCE would be identical.

Using the time multiplexing technique, the chrominance bits of a pixel never lead the corresponding luminance bits. In order to have the correct pixel information, the luminance bits should be delayed until the corresponding chrominance bits are available before being transmitted over the network. This can be implemented in the communication adapter quite simply by using two transmit FIFO's substantially the same as the ones used in the video adapter (See No. 314,998 for detail). Whenever —COMYOCE is active, the luminance bits are pushed into the luminance FIFO. Whenever COMCOCE is active, then chrominance bits are pushed into the chrominance FIFO. When the I/0 device is ready to transmit the video data, 4 bits of information are popped out of the chrominance FIFO and 8 bits of information are popped out of the luminance FIFO which are concatenated to form 12 bits of pixel information.

As will be apparent, the scaling, and thus the window sizing, are readily changeable system parameters and may be easily changed by suitably programming the scaling algorithm to meet the communication network bandwidth requirements.

It should be mentioned that there should be some network protocol which should provide the timing of both —COMVSOUT and —COMHSOUT over the communication network. Whenever either signal is active, then the transmitting node must pass this information over the communication network to the receiving node to ensure proper synchronization timing of the transmitted video data. This function is accomplished by the circuitry shown in FIG. 8 which will be described subsequently.

Video Receiver Interface

On the receiving node, the communication device must generate both Communication Vertical Synchronization Input (—COMVSIN) and Communication Horizontal Synchronization Input (—COMHSIN) from the messages received on the network created by —COMVSOUT and —COMHSOUT on the transmitting node, respectively. Again, —COMVSIN specifies to the video adapter that a new frame is about to start, and the —COMHSIN specifies the video adapter that a current scan line is completed. Furthermore, the communication device should synchronize pixel data received from the network to the local video sample clock (SCLK) generated by the video adapter. After the synchronization, the communication device should activate Communication Video Input Clock Enable (—COMVINCE) which tells the video adapter that there is a pixel data on Communication Video Data Input (COMVIDIN). All of the control signals mentioned above are produced by the communication device, and are synchronized by the SCLK. As indicated in FIG. 3B COMVSIN and COMHSIN are used by the $\overline{VS}$ and $\overline{HS}$ Generator 38 to produce the local horizontal and vertical sync pulse which drive the local node Frame Buffer 34 and display (not shown).

Since only every other field of the source video is sent over the network, only one field of the frame buffer should be updated. During the communication mode, only one field of the frame buffer is enabled to receive video data. This is done simply by ignoring Odd Field (ODDFLD) signal from the television but using a user programmable register bit instead. Therefore, received video data can be stored into either even or odd field space of the frame buffer depending on the register bit. Furthermore, the display output refresh mode (for non-interlaced graphics display) must be designed such that every scan line of the active field is displayed twice on the consecutive scan lines when in the communication mode so that only the selected field is shown on the display. See copending application Ser. No.: 314,623 for further details on how to control the output refresh mode.

Audio Interface

Figure 5A:
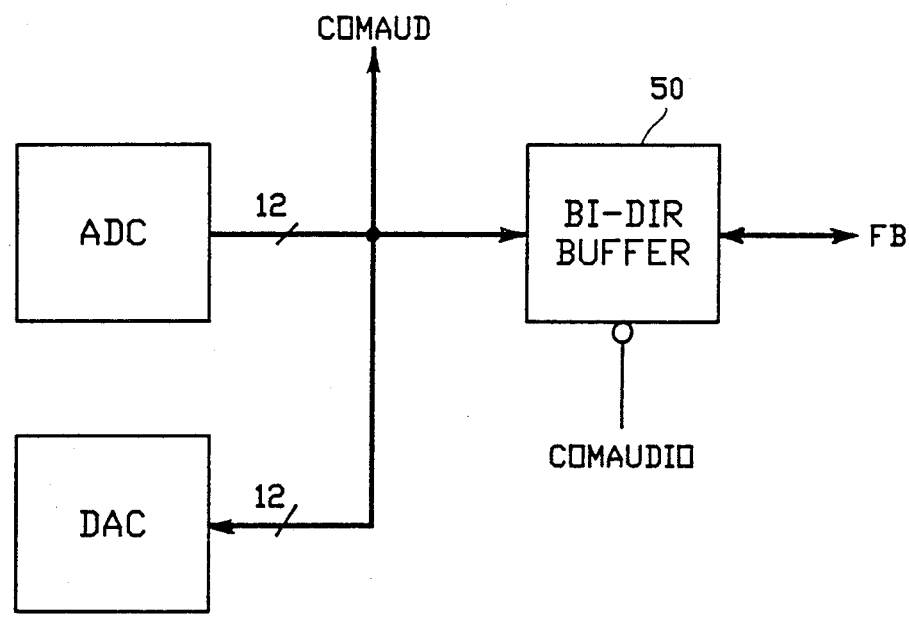
Figure 5B:
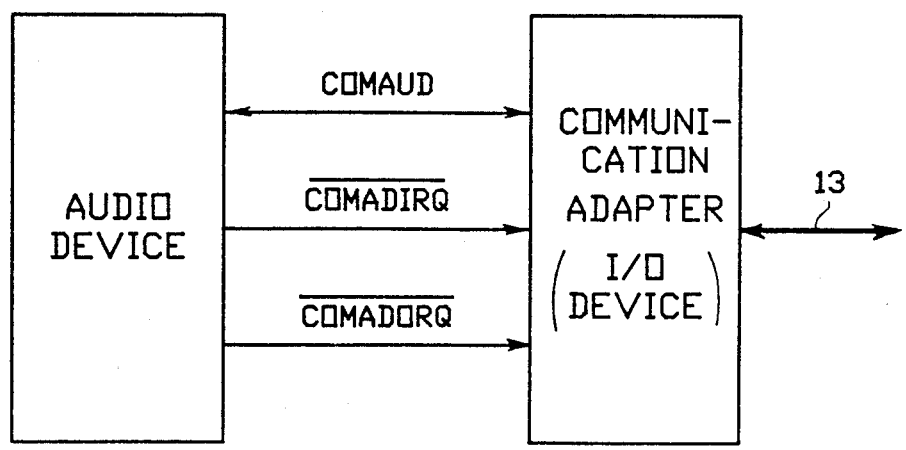
Figure 6:
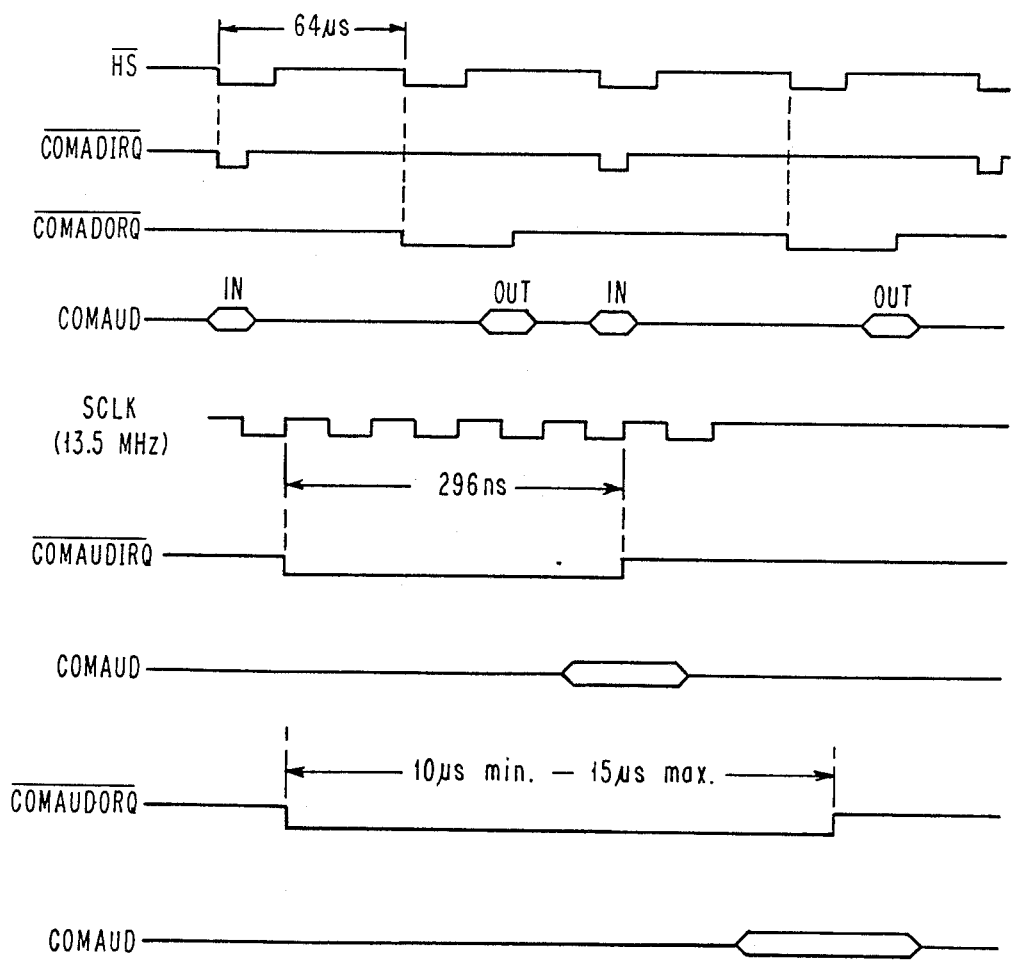
FIG. 6 comprises a series of timing wave forms illustrating the operation of the audio portion of the present system interface.

For audio, bandwidth is not a problem. The block diagram of the interface between the audio device and the communication devices is shown on FIG. 5. The host processor must first set COMAUDIO bit in order to activate the audio communication. When COMAUDIO is set, then the bidirectional buffer 50 is turned off which will isolate the audio A/D and D/A from the frame buffer. This is necessary since the data bus of the frame buffer would be driven by the FIFO, otherwise we would have FIFO and COMAUD (either by ADC or I/0 device) driving simultaneously. To provide a low quality mono audio (8KHz sampling rate), one audio sample must be taken every other scan line, i.e., every other —HS. Conversely, in the receive mode one digital to analog conversion must be taken every other scan line. Notice that the time interval between sampling and digital to analog conversion must be constant, otherwise the audio reproduced would be distorted. Because of this, the local —HS is used to generate the timing necessary for the audio communication. The interface requires a 12 bit bidirectional data bus, Communication Audio Data (COMAUD). As shown on the timing diagram on FIG. 6, a pair of audio sampling and digital to analog conversions takes two —HS periods. For the audio communication mode, the communication device acts as nothing more than a slave device which takes data from COMAUD and transmits over the network whenever Communication Audio Output Request (—COMADORQ) is active, and provides the audio data received over the network to the audio adapter via COMAUD whenever Communication Audio Input Request (—COMADIRQ) is active. Both control signals are sourced by the audio device, and are synchronized to SCLK. The bandwidth required to communicate audio in full duplex mode is:

Bandwidth = 12 bits/64 uS = 185 Kbits/sec.

Video Communication Transmit

During the video communication mode, the source image window is first set to scale down the source video to a desired size. This is done by the host system and, as stated previously is outside the scope of the present invention. Furthermore, the scaling method such as described in copending application Ser. No.: 314,998 should be set up so that only one field of the video source is selected.

Figure 7:
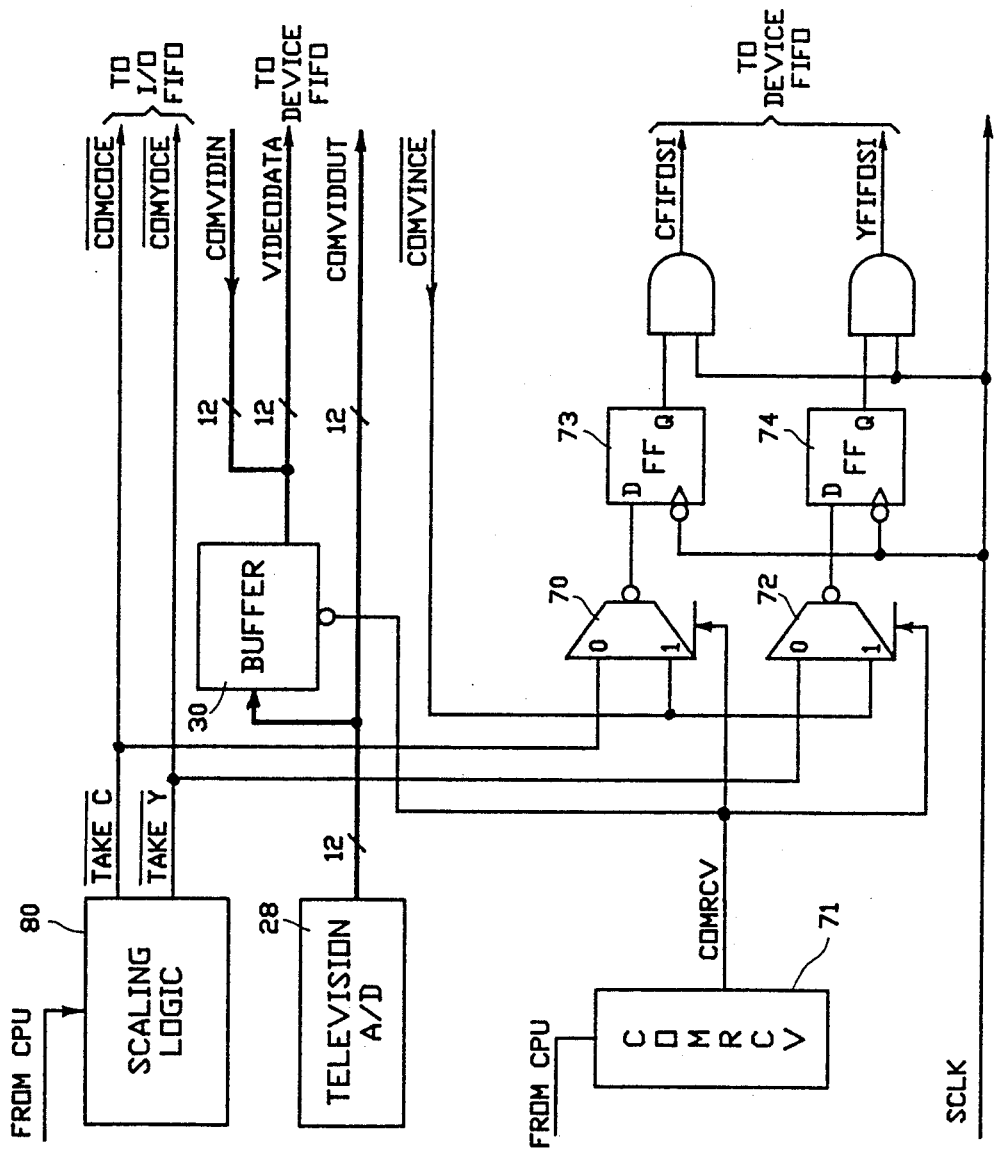
FIG. 7 comprises a functional block diagram of the interface controls for transmitting video over the communication path together with required control signals.

FIG. 7 shows a simplified schematic for controlling the scaling operations in both the interface and the video device. Two signals, Take Chrominance (—TAKEC) and Take Luminance (—TAKEY) are generated from the scaling logic block 80 as setup by the CPU such as shown in application Ser. No.: 314,998. These signals are used to determine which chrominance/luminance bits to take and which to skip. —TAKEC specifies that chrominance bits should be taken. —TAKEY specifies that luminance bits should be taken. These signals are passed to the communication device as —COMCOCE and —COMYOCE, respectively, and control operation of the FIFO therein which receives the raw video data directly from the digital TV A/D device 28 shown in FIG. 3B.

Figure 8:
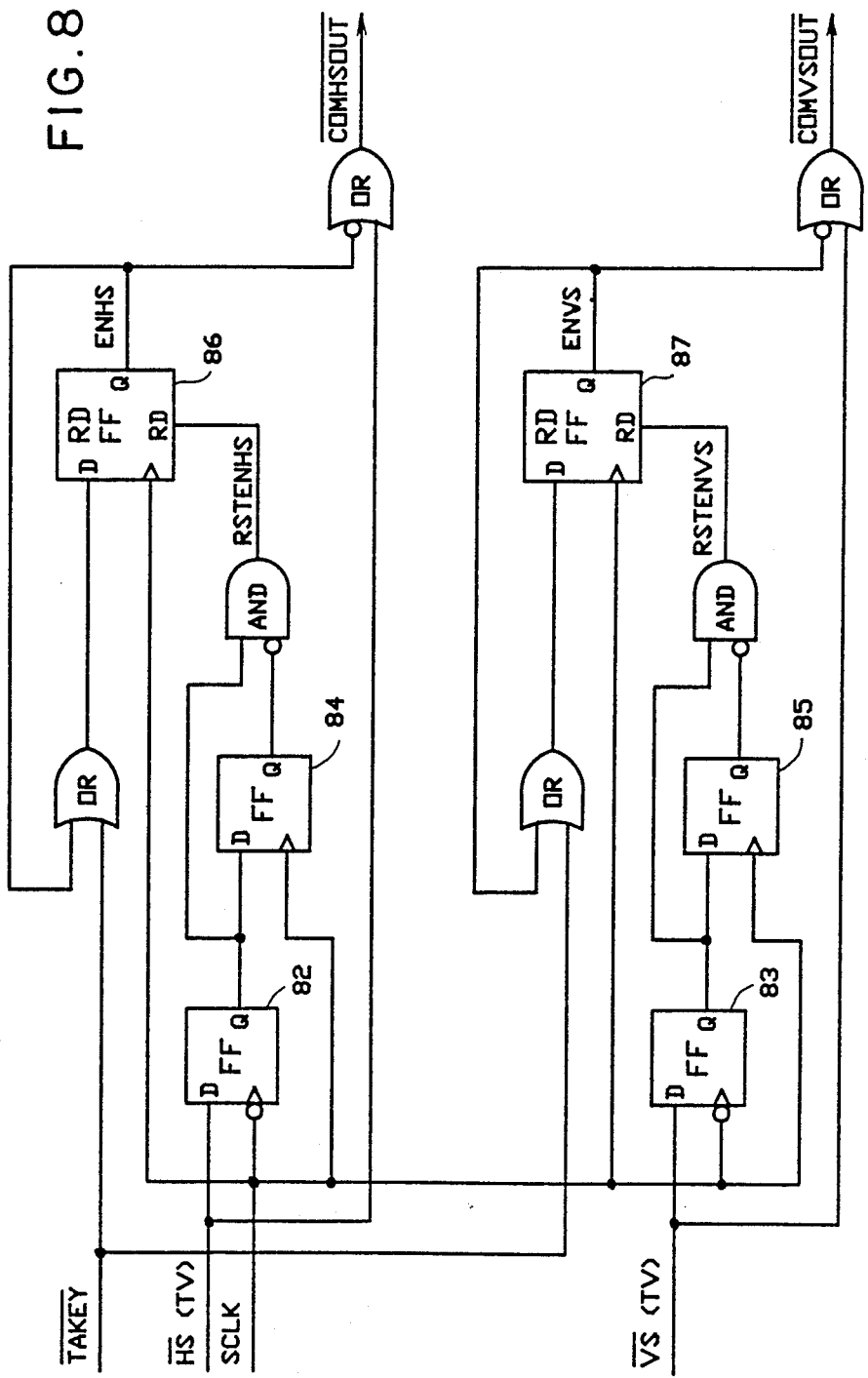
FIG. 8 comprises a functional block diagram of the circuits which generate the vertical and horizontal synchronization output signals.
Figure 9:
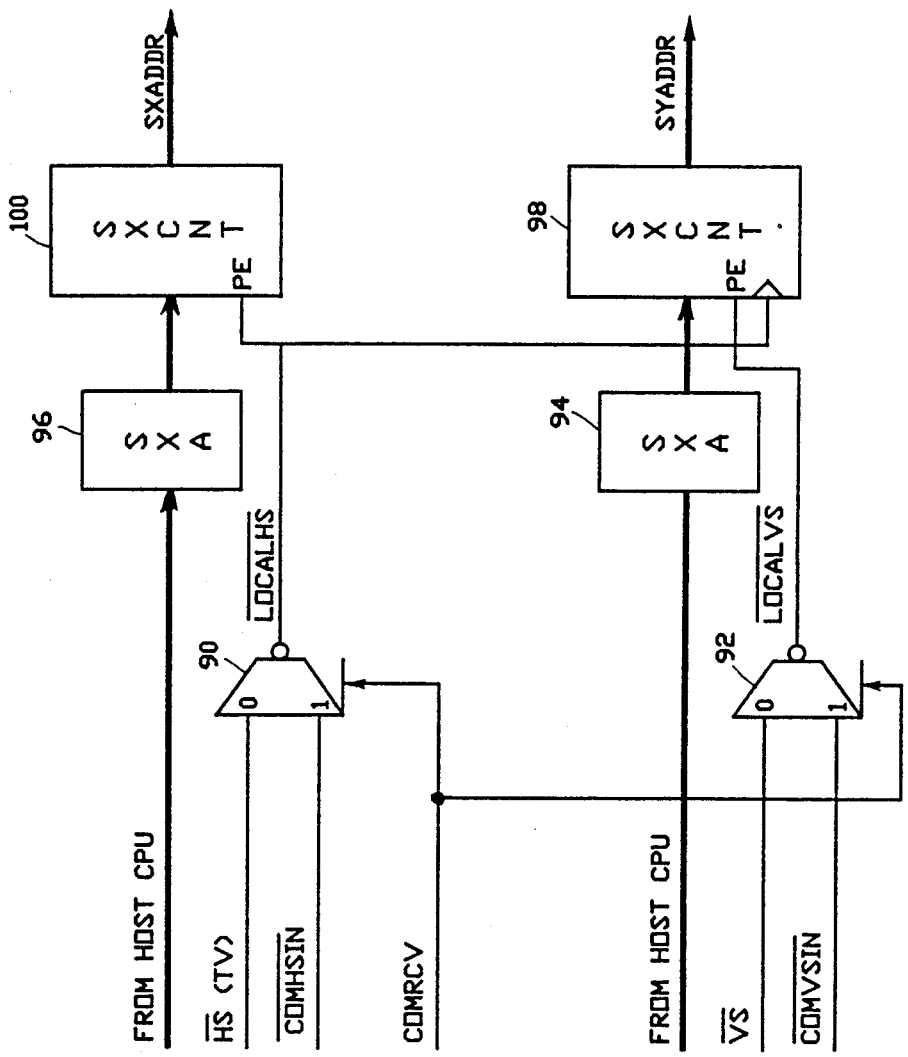
FIG. 9 comprises a functional block diagram of the circuitry which produces the X and Y addresses into the frame buffer respectively utilizing the COMHSIN and COMVSIN signals from the interface.
Figure 10A:
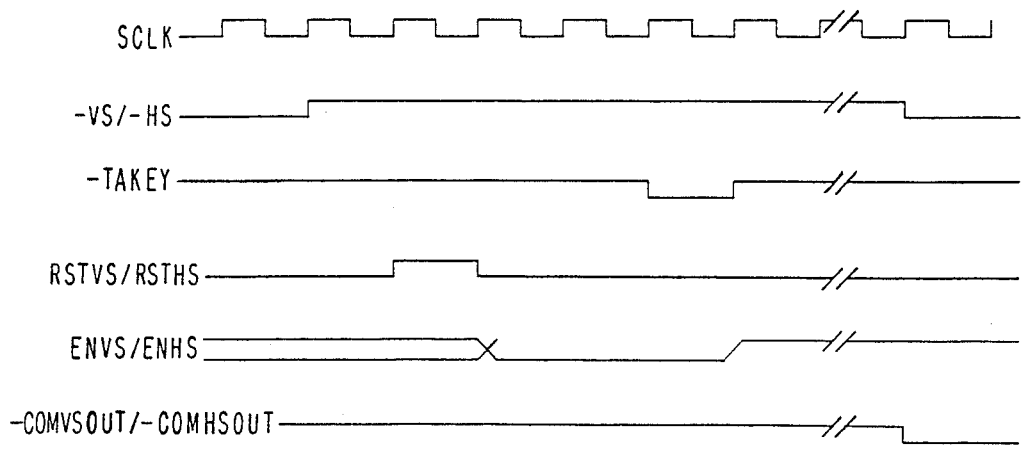
FIG. 10A comprises a timing chart illustrating the timing of the various pulses shown on FIGS. 7 and 8 to generate the COMHSOUT and COMVSOUT signals.
Figure 10B:
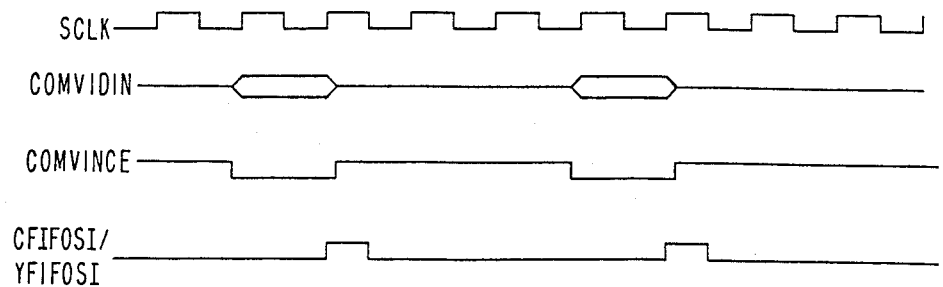
FIG. 10B comprises timing charts illustrating the generation of the chrominance and luminance FIFO shift In signals CFIFOSI and YFIFOSI.

FIG. 8 shows how the Communication Vertical Synchronization Output (—COMVSOUT) and Communication Horizontal Synchronization Output (—COMHSOUT) are generated utilizing the six flip-flops 82–87 and the indicated pulses on FIG. 10. Two SCLK cycles after the —VS/—HS, a pulse, Reset ENVS(RSTENVS)/Reset ENHS(RSTENHS), is generated which resets Enable Vertical Sync (ENVS)/Enable Horizontal Sync (ENHS). If no —TAKEY (or —COMYOCE) is activated until the next —VS/—HS, then —COMVSOUT/—COMHSOUT is suppressed. However, if —TAKEY is active for at least one SCLK cycle, then ENVS/ENHS is set and on the following —VS/—HS, —COMVSOUT/COMHSOUT is generated. See the timing diagram shown on FIG. 10A. Thus the COMHSOUT and COMVSOUT are produced only when a pixel is being transmitted as determined by the TAKE Y signal.

Video Communication Receive

As shown on FIG. 7, in order to receive video from the communication network, the Communication Receive (COMRCV) bit shown as block 71 in the Figure must be set by the host computer. COMRCV disables the buffer 30 which will isolate the TV A/D output 28 from the FIFO 32 (in FIG. 3B). The Video Data (VIDEODATA) is then driven by the communication device via COMVIDIN. Furthermore, COMRCV is used as select input to the two multiplexers 70 and 72. These multiplexers will select the Communication Video Input Clock Enable (—COMVINCE) instead of —TAKEC and —TAKEY generated by the scaling logic (80 in FIG. 7). The —COMVINCE pulse is generated by the communication adapter (12 in FIG. 3A) as already mentioned. The output of these multiplexers is used via Flip-Flops 73 and 74 to generate Chrominance FIFO Shift In (CFIFOSI) and Luminance FIFO Shift In (YFIFOSI) which, as explained previously, controls shifting video data into the FIFO 32. The timing diagram of this is shown on FIG. 10B.

COMRCV is also used to multiplex two more signals. (See FIG. 9) It is used to multiplex signals —VS and —HS in multiplexers 90 and 92 during the communication receive mode with —COMVSIN and —COMHSIN, respectively. Prior to activating COMRCV, the host computer initializes Vertical Sample Initial Address Register (SYA) 94 and Horizontal Sample Initial Address Register (SXA) 96. These two registers specify the destination window location. Two loadable counters, Vertical Sampling Address Counter (SYCNT) 98 and horizontal Sampling Address Counter (SXCNT) 100 are used as pointers to the receiving node's frame buffer (SYADDR and SXADDR). It should be noted that these registers and counters are already existing hardware necessary for normal video sampling and the stating addresses for the window are under local control and would accordingly be loaded by the CPU.

During the communication receive mode, whenever —COMVSIN is active, SYCNT is reinitialized with SYA. Whenever —COMHSIN is active, SYCNT is incremented to point to the next scan line of the frame buffer, and SXCNT is reinitialized with SXA. Furthermore, SXCNT is incremented whenever a pixel data is taken out of the FIFO and stored in the frame buffer. The above operation is very much like the normal video sampling with —VS and —HS as synchronization signals instead of —COMVSIN and —COMHSIN. Due to the fact that the communication interface is very much like that of television interface, it is possible to make use of —COMVSIN and —COMHSIN, with a small amount of hardware logic added to the existing frame buffer hardware to store the received data into the frame buffer during communication mode.

During the broadcast mode, COMRCV 71, is reset on the node that is broadcasting. However, all the other nodes should have their COMRCV set. The video section of the transmitting node works the same as when no communication mode is selected. Thus, the video source that is being transmitted is also displayed on its high resolution screen. However, all other nodes receive the video and its synchronization signals over the network and display it in their high resolution screen.

During the full duplex mode, COMRCV is set on both nodes. Both nodes will receive the full motion video data that the other node transmits and display it on their screen.

Audio Communication Mode

Figure 11:
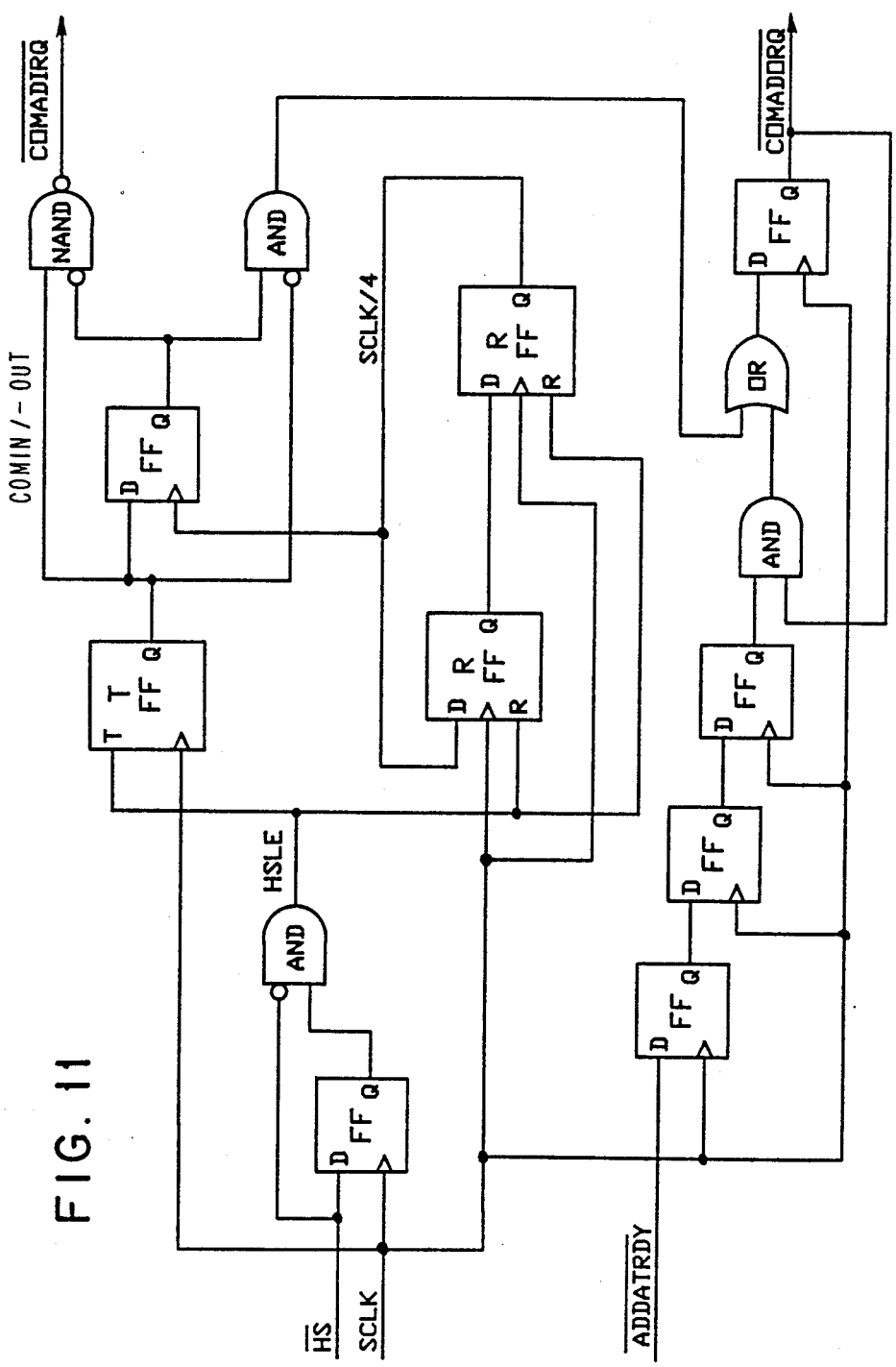
FIG. 11 comprises a functional block diagram of the audio control circuit utilized to generate the requisite audio interface signals COMADIRQ and COMADORQ.
Figure 12:
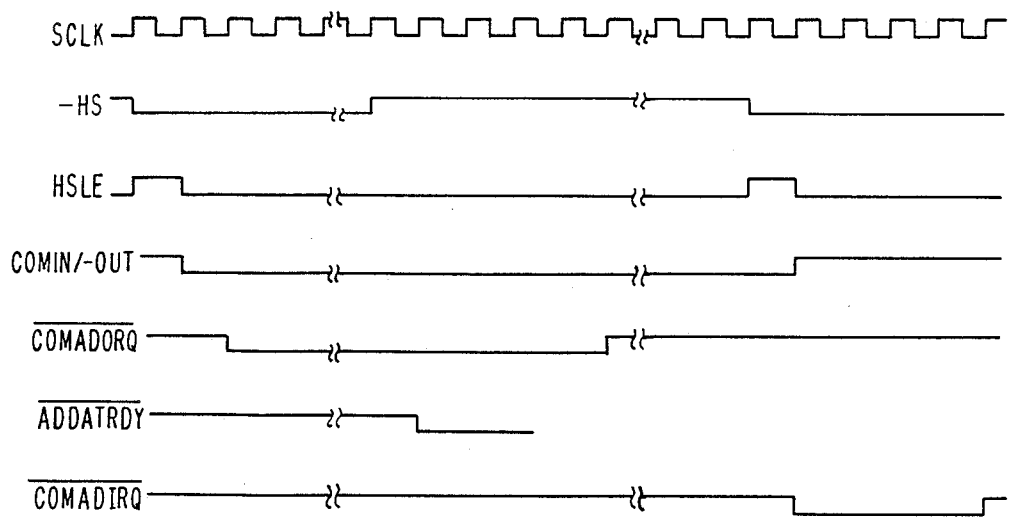
FIG. 12 comprises a timing diagram for the audio control circuit shown in FIG. 11.

A simplified audio circuit for the audio communication mode of the present invention is shown on FIG. 11. All the timing is derived from the local —HS and the system clock (SCLK). The corresponding timing diagram is shown on FIG. 12. The leading edge of the —HS is used to create a pulse, HSLE. HSLE is used for resynchronizing the SCLK/4 (SCLK Divide by 4) and to toggle COMIN/—OUT bit. When COMIN/—OUT is set, the current —HS cycle is in the audio communication input mode. When it is reset, the current —HS cycle is in the audio communication output mode. The left half of the timing diagram shows the audio transmit timing. Shortly after HSLE is generated, if COMIN-/—OUT is reset, then —COMADORQ is activated. —COMADORQ remains active until the audio A/D chip activates Audio Data Ready (—ADDATRDY) this means the A/D conversion is complete and the packet is ready for transmission. —ADDATRDY is used to set —COMADORQ which ends the communication audio output cycle. The communication adapter shall take data from the audio adapter via COMAUD at the rising edge of —COMADORQ and transmit that data.

The later half of the timing diagram shows the audio receive timing. During the receive mode, —COMADIRQ is activated for four SCLK periods. The communication adapter shall drive the received audio data while —COMADIRQ is active.

Conclusions

As described above, the present invention provides an interface to a high speed communication link in a window environment to transmit and receive both audio and video data and which interface is readily achievable in today's technology. It can be used either in broadcast or full duplex mode in which the window size is determined by the transmitter but the destination window location is determined by the receiver. It is a very simple interface in which most of the logic signals are derived easily from the existing signals in each video device. This will allow many different communication devices to be easily interfaced.

Finally, and most importantly, a way as been provided to manage the bandwidth problem by making the bandwidth required to transmit the video programmable by selecting a different size window. All of these will provide a cost effective method of interfacing digitized full motion video and audio to an arbitrary high speed digital communication network.

I claim:

1. In an audio/video communications system for interconnecting a plurality of video display devices each operable under the control of a host CPU, over a limited bandwidth communication channel, an interface architecture comprising means for connecting the individual video display devices to associated communication adapters which are in turn connected to said communication channel, said system being selectively operable in a "receive" and a "transmit" mode, and wherein each video display device includes;

a local system clock source for producing a series of clock pulses at the video sampling rate (SCLK),
a digital TV signal source for producing a serial digital TV pixel data stream (COMVIDOUT) for selective transmission over said communication channel,
a frame buffer for storing video data to be displayed on an attached monitor,
a memory means located in series with the input to said frame buffer for temporarily storing all data to be subsequently stored in the frame buffer,
a scaling control means for determining which scan lines and pixels generated by said digital TV signal source are to be skipped as a result of a predetermined scaling procedure, and for generating signals (COMYOCE and COMCOCE) which specify which chrominance and luminance data fields in a particular TV scan line and which scan lines are to be transmitted,
vertical and horizontal sync generator means for supplying vertical and horizontal sync signals to control both the storage of video data in the frame buffer and also the transmission of data over said communication channel, (COMVSOUT, COMHSOUT),
means for storing incoming video data (COMVIDIN) from the communication adapter in said series memory means,
means in said vertical and horizontal sync signal generating means for synchronizing the storage of incoming data from said channel in the frame buffer in accordance with input vertical and horizontal sync signals (COMHSIN, COMVSIN) received from the communication adapter, and
further means in said scaling control means for storing data into said series memory means when the system is in 'receive mode' under control of a communication input clock enable (COMVINCE) signal from the communication adapter which causes the chrominance and luminance pixels on the channel to be gated into and stored in said series memory.

2. An audio/video communication system as set forth in claim 1, wherein said memory means located in series with said frame buffer is a first-in-first-out memory (FIFO) and include means responsive to signals from said scaling control means for storing data into said FIFO selectively under control of said COMYOCE, COMCOCE signals or said COMVINCE signals.

3. An audio/video communication system as set forth in claim 2, including a data path having gating means located between the output of said digital TV signal source and the input to the local device FIFO which may be interrupted by the host CPU when it is desired to have duplex communication between a first video device and other devices connected to said communication system including means to cause a transmitting device to display only a received scaled video window image when operating in duplex mode and to display its own transmitted scaled video window image when not operating in duplex mode.

4. An audio/video communication system as set forth in claim 3, wherein said vertical and horizontal sync signal generator means includes means operable when said system is in the "receive mode" whereby the received vertical and horizontal sync signals COMVSIN, COMHSIN for indexing the frame buffer address circuitry beginning at a predetermined origin address from the host CPU and storing the received video data COMVIDIN into said frame buffer at the generated addresses for subsequent display.

5. An audio/video communication system as set forth in claim 4, wherein said horizontal and vertical sync generator means includes means operable when said system is not in "receive mode" for indexing the frame buffer addressing circuitry beginning at a predetermined origin address from the host CPU and storing locally originated scaled video data into said frame buffer for subsequent display.

6. An audio/video communication system interface architecture as set forth in claim 1, further including means for interspersing digital audio produced by said digital TV signal source between horizontal scan lines of said video data on the channel, said means utilizing the horizontal sync signal (HS) and the system clock (SCLK) to achieve the required synchronization of audio and video signal transmission and storage.

7. An audio/video communication system as set forth in claim 6, wherein said interface includes means for transmitting digital audio data (COMAUD) over and receiving such data from said communication channel, and means for generating audio output and input request signals (COMADORQ, COMADIRQ) synchronized with the horizontal sync signal (HS) from the digital TV signal source and the system clock (SCLK) when a packet of digital audio data is ready to be transmitted or stored in the local memory.

8. An interface architecture for interconnecting a plurality of video display devices through associated communication adapters together over a high speed digital communication link having limited bandwidth, said architecture including means at each node for providing the following signals for transmission to the communication adapter during a transmit mode operation; sequential pixels of digital data (COMVIDOUT) comprising separate luminance and chrominance fields from a digital TV source associated with each display node, (2) a local system clock pulse stream (SCLK), (3) vertical and horizontal communication output sync signals (COMSOUT, COMSHOUT) synchronized with COMVIDOUT, (4) luminance and chrominance clock enable signals (COMYOCE, COMCOCE), determined by a scaling algorithm utilized in a transmitting video device to specify both the pixels which are to be transmitted and the proper luminance and chrominance fields associated with those pixels to be combined and transmitted over the communication system and/or be displayed on the attached monitor;

and further means at each node operative when in the "receive mode" for (5) receiving a sequence of video input data pixels (COMVIDIN), (6) a video input data clock enable signal from a communication adapter (COMVINCE) which allows all pixel data received from the channel to be stored at a predetermined location in the local frame buffer and (7) horizontal and vertical video input sync signals (COMHSIN, COMVSIN) from the communication adapter for properly synchronizing the storing of the received video input data (COMVIDIN) into proper address locations in the receiving node's frame buffer.

9. An interface architecture as set forth in claim 8, including means for selectively permitting a transmitting node to display a scaled video window data which it is concurrently transmitting over said communication link.

* * * * *